United States Patent
Johnson et al.

(10) Patent No.: US 9,936,630 B2
(45) Date of Patent: Apr. 10, 2018

(54) MOUNTING ASSEMBLY FOR AN AGRICULTURAL PRODUCT CONVEYING SYSTEM

(71) Applicant: CNH Industrial America LLC, New Holland, PA (US)

(72) Inventors: Chad M. Johnson, Arlington Heights, IL (US); Marvin A. Prickel, Homer Glen, IL (US); Brian John Anderson, Yorkville, IL (US)

(73) Assignee: CNH Industrial America LLC, New Holland, PA (US)

( * ) Notice: Subject to any disclaimer, the term of this patent is extended or adjusted under 35 U.S.C. 154(b) by 69 days.

(21) Appl. No.: 15/011,232

(22) Filed: Jan. 29, 2016

(65) Prior Publication Data

US 2017/0215333 A1   Aug. 3, 2017

(51) Int. Cl.
*A01C 7/20* (2006.01)

(52) U.S. Cl.
CPC .............. *A01C 7/201* (2013.01); *A01C 7/206* (2013.01)

(58) Field of Classification Search
CPC ........... A01C 7/20; A01C 7/206; A01C 7/201; A01C 7/082
USPC ............................................ 111/71, 170, 171
See application file for complete search history.

(56) References Cited

U.S. PATENT DOCUMENTS

| | | | |
|---|---|---|---|
| 734,086 A * | 7/1903 | Packham | A01C 7/206 193/9 |
| 2,605,016 A | 7/1952 | Richwine | |
| 5,533,651 A | 7/1996 | Eddy et al. | |
| 5,619,939 A | 4/1997 | Herman et al. | |
| 5,915,313 A | 6/1999 | Bender et al. | |
| 6,332,413 B1 * | 12/2001 | Stufflebeanm | A01C 7/046 111/170 |
| 7,021,224 B2 | 4/2006 | Mayerle et al. | |
| 7,152,541 B2 | 12/2006 | Ptacek | |
| 7,584,707 B2 * | 9/2009 | Sauder | A01C 7/206 111/140 |
| 8,113,132 B2 | 2/2012 | Sauder et al. | |
| 8,201,507 B2 | 6/2012 | Sauder et al. | |
| 8,499,703 B2 | 8/2013 | Hagny | |
| 8,701,575 B2 | 4/2014 | Friggstad | |
| 2003/0085326 A1 * | 5/2003 | Simonson | F16L 3/1226 248/51 |
| 2005/0204971 A1 * | 9/2005 | VenHuizen | A01C 7/206 111/185 |
| 2008/0011209 A1 * | 1/2008 | Peterson | A01C 7/082 111/170 |

(Continued)

FOREIGN PATENT DOCUMENTS

EP   2974585 A1 * 1/2016 ............. A01C 7/206

*Primary Examiner* — John Weiss
(74) *Attorney, Agent, or Firm* — Rebecca L. Henkel; Rickard K. DeMille

(57) ABSTRACT

A mounting assembly for an agricultural product conveying system includes a mount having a seed tube mounting feature and a biasing member mounting feature. The mounting assembly also includes a biasing member configured to support a powered agricultural product conveyor. The seed tube mounting feature is configured to engage a corresponding mounting feature of a seed tube to support the seed tube on the mount, and the biasing member mounting feature is configured to engage a corresponding mounting feature of the biasing member to support the biasing member on the mount.

19 Claims, 9 Drawing Sheets

(56) References Cited

U.S. PATENT DOCUMENTS

| | | |
|---|---|---|
| 2014/0190712 A1 | 7/2014 | Bassett |
| 2014/0224843 A1 | 8/2014 | Rollenhagen |
| 2015/0223391 A1 | 8/2015 | Wendte et al. |
| 2015/0293257 A1* | 10/2015 | Liebich .................. A01C 21/00 701/50 |
| 2015/0319919 A1 | 11/2015 | Sauder et al. |
| 2016/0212932 A1* | 7/2016 | Radtke .................. A01C 7/046 |
| 2017/0000018 A1* | 1/2017 | Johnson .................. A01C 7/046 |

* cited by examiner

MOUNTING ASSEMBLY FOR AN AGRICULTURAL PRODUCT CONVEYING SYSTEM

BACKGROUND

The present disclosure relates generally to a mounting assembly for an agricultural product conveying system.

Generally, planting implements (e.g., planters) are towed behind a tractor or other work vehicle via a mounting bracket secured to a rigid frame of the implement. Planting implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. An agricultural product conveying system (e.g., seed tube or powered agricultural product conveyor) is configured to deposit seeds and/or other agricultural products (e.g., fertilizer) into the trench. The opener/agricultural product conveying system is followed by closing discs that move displaced soil back into the trench and/or a packer wheel that packs the soil on top of the deposited seeds.

In certain row units, the agricultural product conveying system includes a seed tube, in which seeds, or other agricultural products, drop under the influence of gravity from a seed metering system into the trench. Seed tubes may enable a variety of different agricultural products, such as field corn, soybeans, grain sorghum, sunflowers, and sweet corn, among others, to be planted within a field. However, because the seeds drop under the influence of gravity, the horizontal exit speed of the seeds may be limited to about 5 miles per hour (MPH), for example, thereby limiting the speed of the planting implement to about 5 MPH. Accordingly, certain row units may include an agricultural product conveying system having a powered agricultural product conveyor. The powered agricultural product conveyor includes a system that drives seeds from the metering system into the trench at a horizontal exit speed greater than the horizontal exit speed of seeds expelled from a seed tube under the influence of gravity. Accordingly, the speed of the planting implement may be increased to about 10 MPH, for example, thereby increasing the efficiency of planting operations. However, the powered agricultural product conveyor may be configured to flow fewer types of agricultural products than seed tubes. For example, the powered agricultural product conveyor may be configured to flow field corn and soybeans. As a result, certain agricultural operations may employ a first set of row units for planting certain types of agricultural products (e.g., field corn and soybeans), and a second set of row units for planting other types of agricultural products (e.g., grain sorghum, sunflowers, and sweet corn). Acquiring two sets of row units may significantly increase the expenses associated with the agricultural operation.

BRIEF DESCRIPTION

In one embodiment, a mounting assembly for an agricultural product conveying system includes a mount having a seed tube mounting feature and a biasing member mounting feature. The mounting assembly also includes a biasing member configured to support a powered agricultural product conveyor. The seed tube mounting feature is configured to engage a corresponding mounting feature of a seed tube to support the seed tube on the mount, and the biasing member mounting feature is configured to engage a corresponding mounting feature of the biasing member to support the biasing member on the mount.

In another embodiment, a mounting assembly for an agricultural product conveying system includes a mount having a seed tube mounting feature and a biasing member mounting feature. The mounting assembly also includes a biasing member configured to support a powered agricultural product conveyor. The seed tube mounting feature is configured to capture a protrusion of a seed tube, and the seed tube mounting feature is configured to support the seed tube on the mount. The biasing member mounting feature is configured to capture a protrusion of the biasing member, and the biasing member mounting feature is configured to support the biasing member on the mount.

In a further embodiment, a mounting assembly for an agricultural product conveying system includes a mount configured to support the agricultural product conveying system. The mount includes a mounting plate configured to be positioned above a frame of an agricultural row unit to establish a gap between the mounting plate and the frame sufficient to facilitate passage of a conduit between the mounting plate and the frame.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
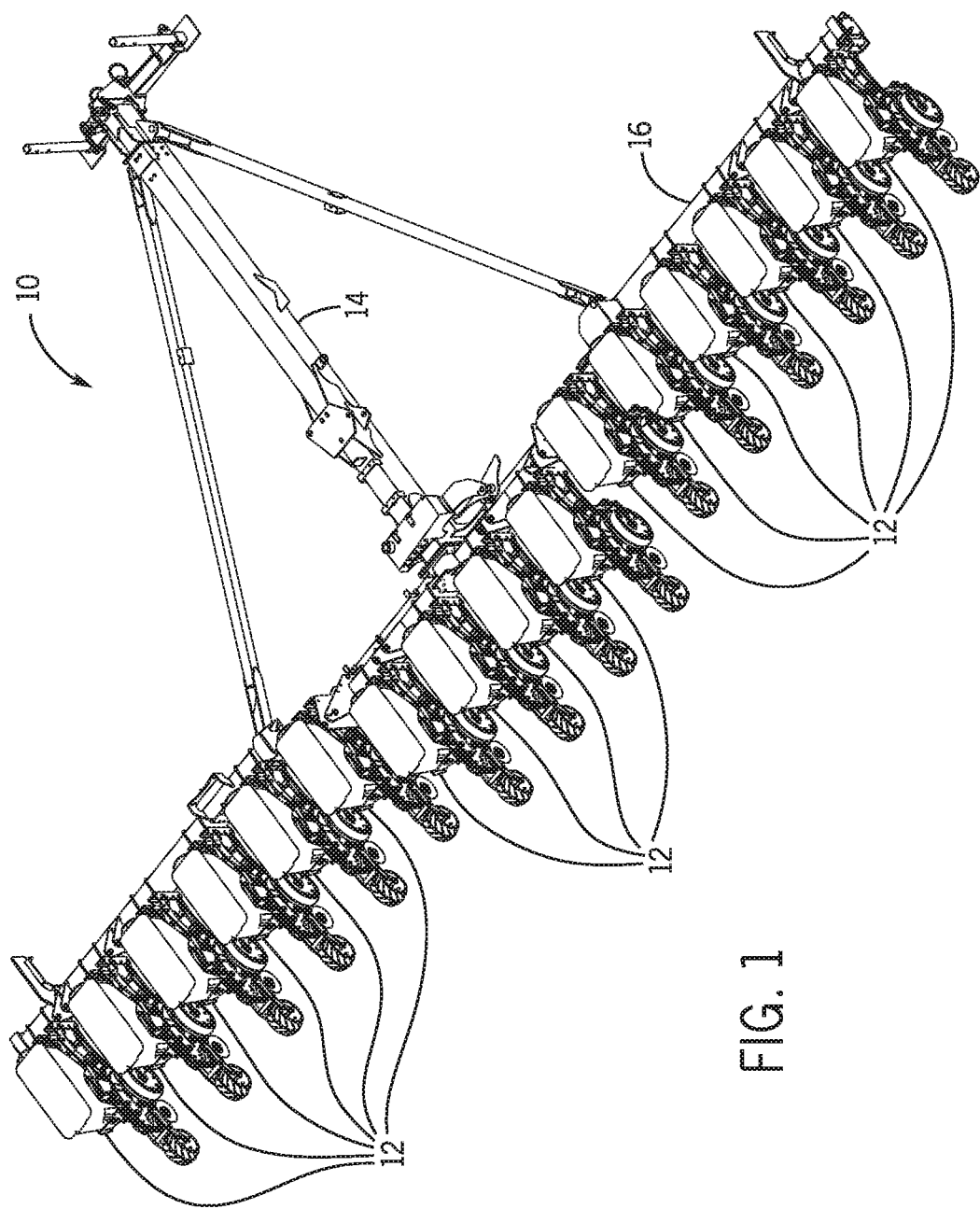
FIG. 1 is a perspective view of an embodiment of an agricultural implement having multiple row units distributed across a width of the agricultural implement.

FIG. 1 is a perspective view of an embodiment of an agricultural implement 10 (e.g., planting implement) having multiple row units 12 distributed across a width of the agricultural implement 10. The implement 10 is configured to be towed through a field behind a work vehicle, such as a tractor. As illustrated, the implement 10 includes a tongue assembly 14, which includes a hitch configured to couple the implement 10 to an appropriate tractor hitch (e.g., via a ball, clevis, or other coupling). The tongue assembly 14 is coupled to a tool bar 16 which supports multiple row units 12. As discussed in detail below, at least one row unit 12 may include a mounting assembly configured to selectively support a seed tube or a powered agricultural product conveyor. For example, in certain embodiments, the mounting assembly includes a mount having a seed tube mounting feature and a biasing member mounting feature. The mounting assembly also includes a biasing member configured to support a powered agricultural product conveyor. The seed tube mounting feature is configured to engage a corresponding mounting feature of a seed tube to support the seed tube on the mount. In addition, the biasing member mounting feature is configured to engage a corresponding mounting feature of the biasing member to support the biasing member on the mount.

By way of example, to plant grain sorghum, sunflowers, or sweet corn, for example, an operator may couple the seed tube to the mount by engaging the mounting feature of the seed tube with the seed tube mounting feature of the mount. The operator may then commence planting operations. However, the speed of the planting implement may be limited to about 5 miles per hour (MPH), for example, due to the limited horizontal exit speed of the seeds from the seed tube. In addition, to plant field corn or soybeans, for example, at higher speeds (e.g., about 10 MPH), the seed tube may be disengaged from the mount. The operator may then couple the biasing member to the mount by engaging the mounting feature of the biasing member with the biasing member mounting feature of the mount. Next, the operator may engage a protrusion of the powered agricultural product conveyor with the biasing member such that the biasing member supports the powered agricultural product conveyor. The operator may then commence planting operators at higher speeds (e.g., about 10 MPH). However, the powered agricultural product conveyor may be configured to flow fewer types of agricultural products than the seed tube. Because the mounting assembly enables an operator to switch between multiple agricultural product conveying systems (e.g., remove the seed tube and install the powered agricultural product conveyor, and remove the powered agricultural product conveyor and install the seed tube), agricultural operations may utilize a single set of row units for planting a variety of agricultural products (e.g., grain sorghum, sunflowers, or sweet corn at lower speeds, and field corn or soybeans at higher speeds). As a result, the cost of agricultural operations may be reduced, as compared to agricultural operations that include a first set of row units with powered agricultural product conveyors and a second set of row units with seed tubes.

Figure 2:
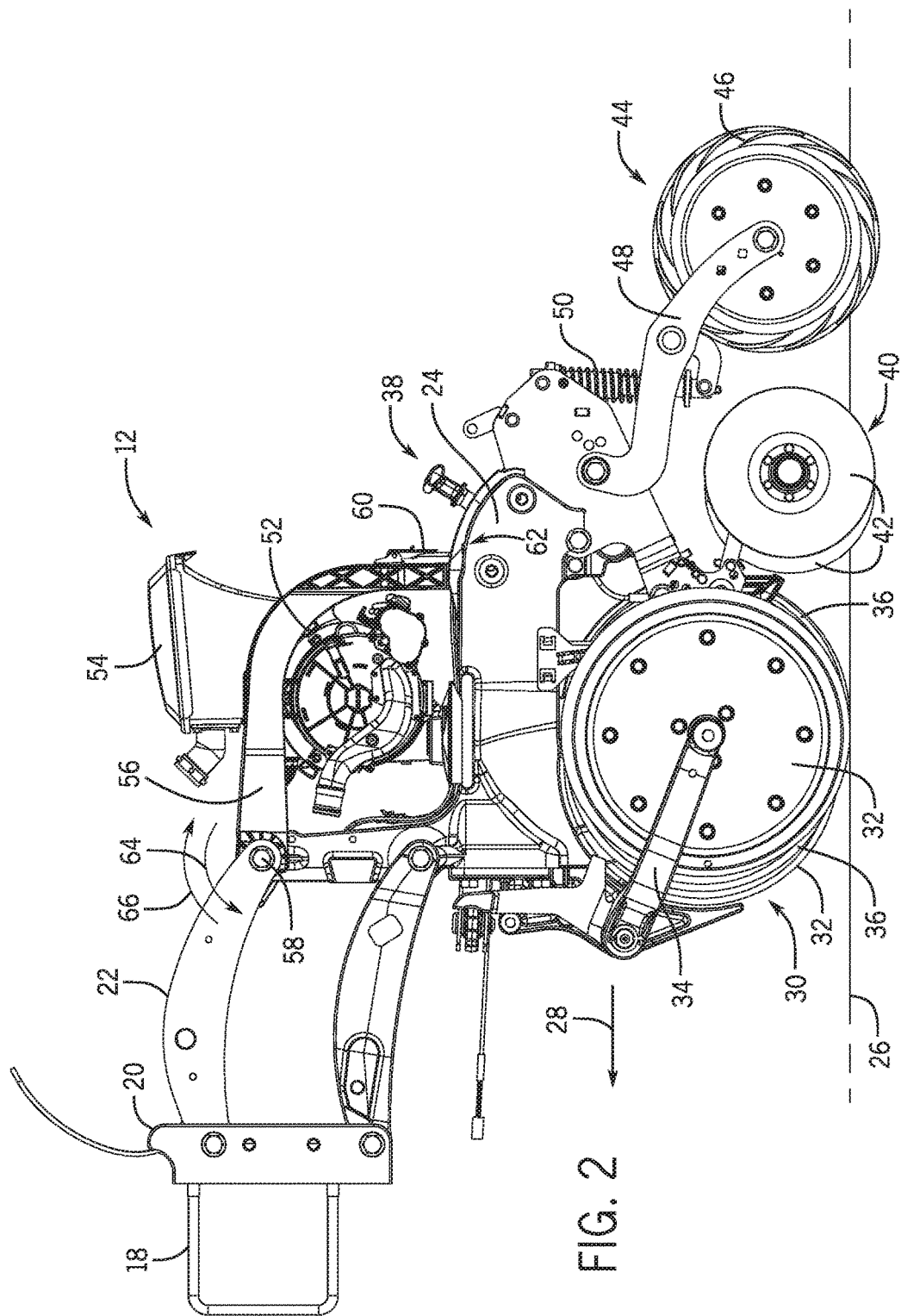
FIG. 2 is a side view of an embodiment of a row unit that may be employed on the agricultural implement of FIG. 1.

FIG. 2 is a side view of an embodiment of a row unit 12 that may be employed on the agricultural implement of FIG. 1. The row unit 12 includes a mount 18 configured to secure the row unit 12 to the tool bar of the agricultural implement. In the illustrated embodiment, the mount 18 includes a u-bolt that secures a bracket 20 of the row unit 12 to the tool bar. However, it should be appreciated that in alternative embodiments, the mount may include another suitable device that couples the row unit to the tool bar. A linkage assembly 22 extends from the bracket 20 to a frame 24 of the row unit 12. The linkage assembly 22 is configured to enable vertical movement of the frame 24 relative to the tool bar in response to variations in a soil surface 26. In certain embodiments, a down pressure system (e.g., including a hydraulic actuator, a pneumatic actuator, etc.) may be coupled to the linkage assembly 22 and configured to urge the frame 24 toward the soil surface 26. While the illustrated linkage assembly 22 is a parallel linkage assembly (e.g., a four-bar linkage assembly), it should be appreciated that in alternative embodiments, another suitable linkage assembly may extend between the bracket and the frame.

The row unit 12 is configured to deposit seeds and/or other agricultural products at a desired depth beneath the soil surface 26 as the row unit 12 traverses a field along a direction of travel 28. The row unit 12 includes an opener assembly 30 that forms a trench in the soil for seed deposition into the soil. In the illustrated embodiment, the opener assembly 30 includes gauge wheels 32, arms 34 that pivotally couple the gauge wheels 32 to the frame 24, and opener discs 36. The opener discs 36 are configured to excavate a trench into the soil, and the gauge wheels 32 are configured to control a penetration depth of the opener discs 36 into the soil. In the illustrated embodiment, the row unit 12 includes a depth control system 38 configured to control the vertical position of the gauge wheels 32 (e.g., by blocking rotation of the arms in the upward direction beyond a selected orientation), thereby controlling the penetration depth of the opener discs 36 into the soil.

As discussed in detail below, the row unit 12 also includes an agricultural product conveying system (e.g., seed tube or powered agricultural product conveyor) configured to deposit seeds and/or other agricultural products (e.g., fertilizer) into the trench. The opener assembly 30 and the agricultural product conveying system are followed by a closing assembly 40 that moves displaced soil back into the trench. In the illustrated embodiment, the closing assembly 40 includes two closing discs 42. However, it should be appreciated that in alternative embodiments, the closing assembly may include other closing devices (e.g., a single closing disc, etc.). In addition, in certain embodiments, the closing assembly may be omitted. In the illustrated embodiment, the closing assembly 40 is followed by a packing assembly 44 configured to pack soil on top of the deposited seeds and/or other agricultural products. The packing assembly 44 includes a packer wheel 46, an arm 48 that pivotally couples the packer wheel 46 to the frame 24, and a biasing member 50 configured to urge the packer wheel 46 toward the soil surface 26, thereby enabling the packer wheel to pack soil on top of the deposited seeds and/or other agricultural products. While the illustrated biasing member 50 includes a spring, it should be appreciated that in alternative embodiments, the biasing member may include another suitable biasing device, such as a hydraulic cylinder or a pneumatic cylinder, among others.

The row unit 12 includes a vacuum seed meter 52 configured to receive agricultural product (e.g., seeds) from a hopper 54. In certain embodiments, the vacuum seed meter 52 includes a disc having multiple openings. An air pressure differential between opposite sides of the disc induces the agricultural product (e.g., seeds) to be captured within the openings. As the disc rotates, the agricultural product is conveyed toward the agricultural product conveying system. When the agricultural product (e.g., seed) is aligned with an inlet to the agricultural product conveying system, the air pressure on each side of the disc is substantially equalized (e.g., at the end of a vacuum passage), thereby enabling the agricultural product (e.g., seed) to enter the agricultural product conveying system (e.g., seed tube or powered agricultural product conveyor). The agricultural product conveying system then directs the agricultural product to the trench. While the illustrated embodiment includes a vacuum seed meter, it should be appreciated that in alternative embodiments, other suitable seed/agricultural product meters may be utilized. As used herein, "vacuum" refers to an air pressure that is less than the ambient atmospheric air pressure, and not necessarily 0 pa.

In the illustrated embodiment, the row unit 12 is configured to facilitate installation and removal of the seed meter 52 and the agricultural product conveying system. As illustrated, the row unit 12 includes an arm 56 pivotally coupled to the frame 24 at a joint 58. The seed meter 52 is removably coupled to the arm 56 and configured to rotate with the arm 56 about the joint 58. The row unit 12 also includes a latch 60 configured to secure a distal end 62 of the arm 56, opposite the joint 58, to the frame 24. Accordingly, to remove the seed meter 52, the latch 60 is disengaged, the arm 56 is rotated upwardly about the joint 58 in a first rotational direction 64, and the seed meter 52 is removed from the arm 56. In addition, rotating the arm 56 to the raised position facilitates access to the agricultural product conveying system, thereby facilitating installation and removal of the agricultural product conveying system. Furthermore, with the arm 56 in the raised position after removal of one seed meter, another seed meter may be installed by coupling the seed meter to the arm, rotating the arm downwardly about the joint in a second rotational direction 66, and engaging the latch. The arm 56 is configured to substantially align an outlet of the seed meter 52 with the inlet of the agricultural product conveying system, thereby enabling seeds and/or other agricultural products to flow from the seed meter 52 to the agricultural product conveying system. In addition, with the distal end 62 of the arm 56 secured to the frame 24 by the latch 60, movement of the seed meter 52 away from the agricultural product conveying system is blocked.

Figure 3:
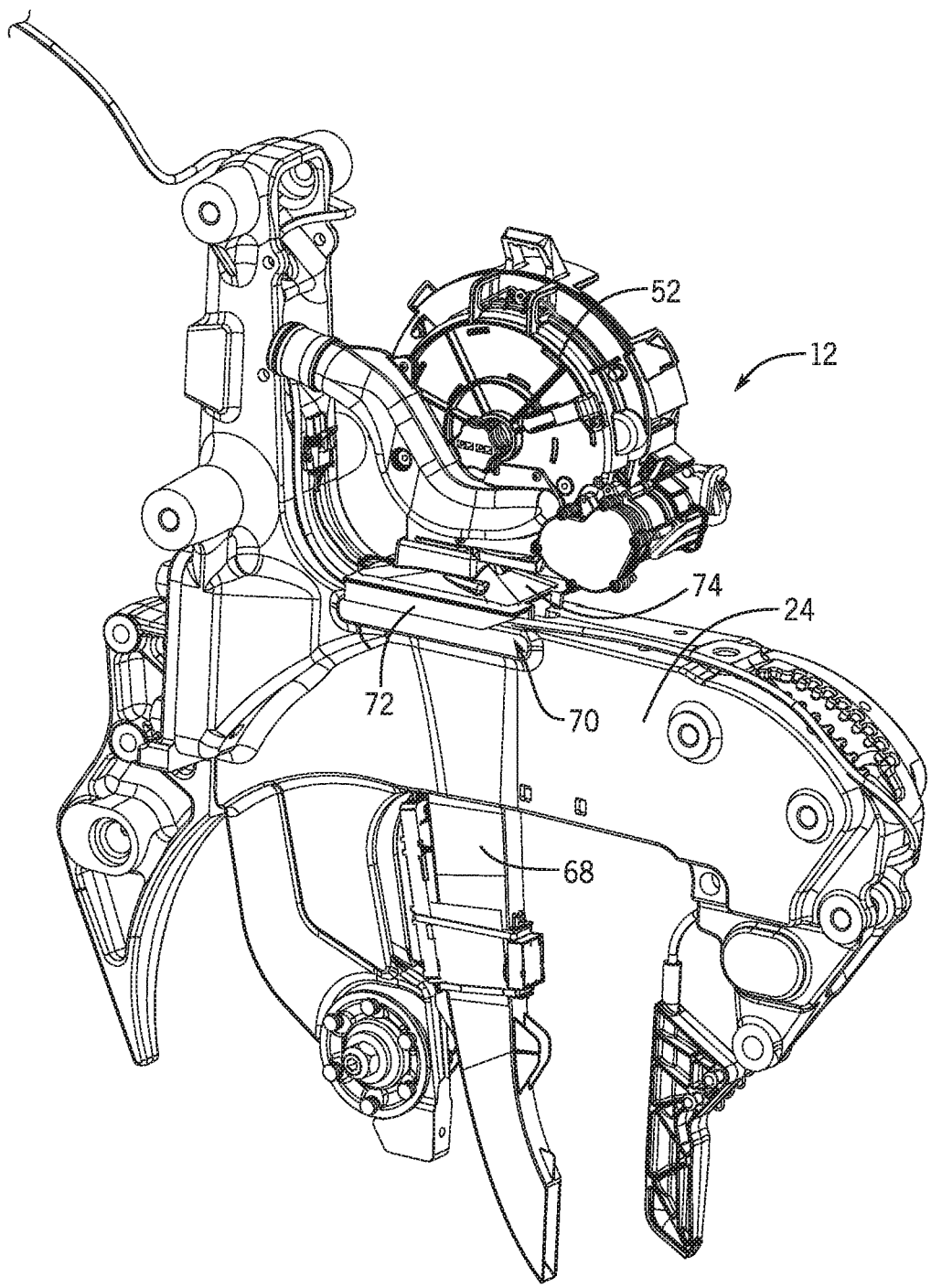
FIG. 3 is a perspective view of a portion of the row unit of FIG. 2, in which a seed tube is coupled to a frame of the row unit by a mounting assembly.

FIG. 3 is a perspective view of a portion of the row unit 12 of FIG. 2, in which a seed tube 68 is coupled to the frame 24 of the row unit 12 by a mounting assembly 70. In the illustrated embodiment, the mounting assembly 70 includes a mount 72 (e.g., formed from a polymeric material via injection molding, etc.) having a seed tube mounting feature configured to engage a corresponding mounting feature of the seed tube 68 to support the seed tube 68 on the mount. For example, the seed tube mounting feature may include an opening and a channel, and the corresponding mounting feature of the seed tube may include a protrusion. The channel may be configured to guide the protrusion toward the opening, and the opening may be configured to receive/capture the protrusion, thereby supporting the seed tube on the mount.

In the illustrated embodiment, the mount 72 is also configured to engage a boot 74 of the seed meter 52. The boot 74 and the mount 72 are configured to substantially surround the interface between the outlet of the seed meter 52 and the inlet of the seed tube 68, thereby substantially blocking field debris (e.g., rocks, crop residue, etc.) from entering the seed tube 68. In addition, the boot 74 may be formed from a resilient material and configured to flex in response to movement of the seed meter 52 relative to the mount 72. Accordingly, the boot 74 may accommodate variations in the position of the seed meter 52 relative to the frame 24 (e.g., due to variations in the position/orientation of the arm, the latch, the joint, etc.).

Figure 4:
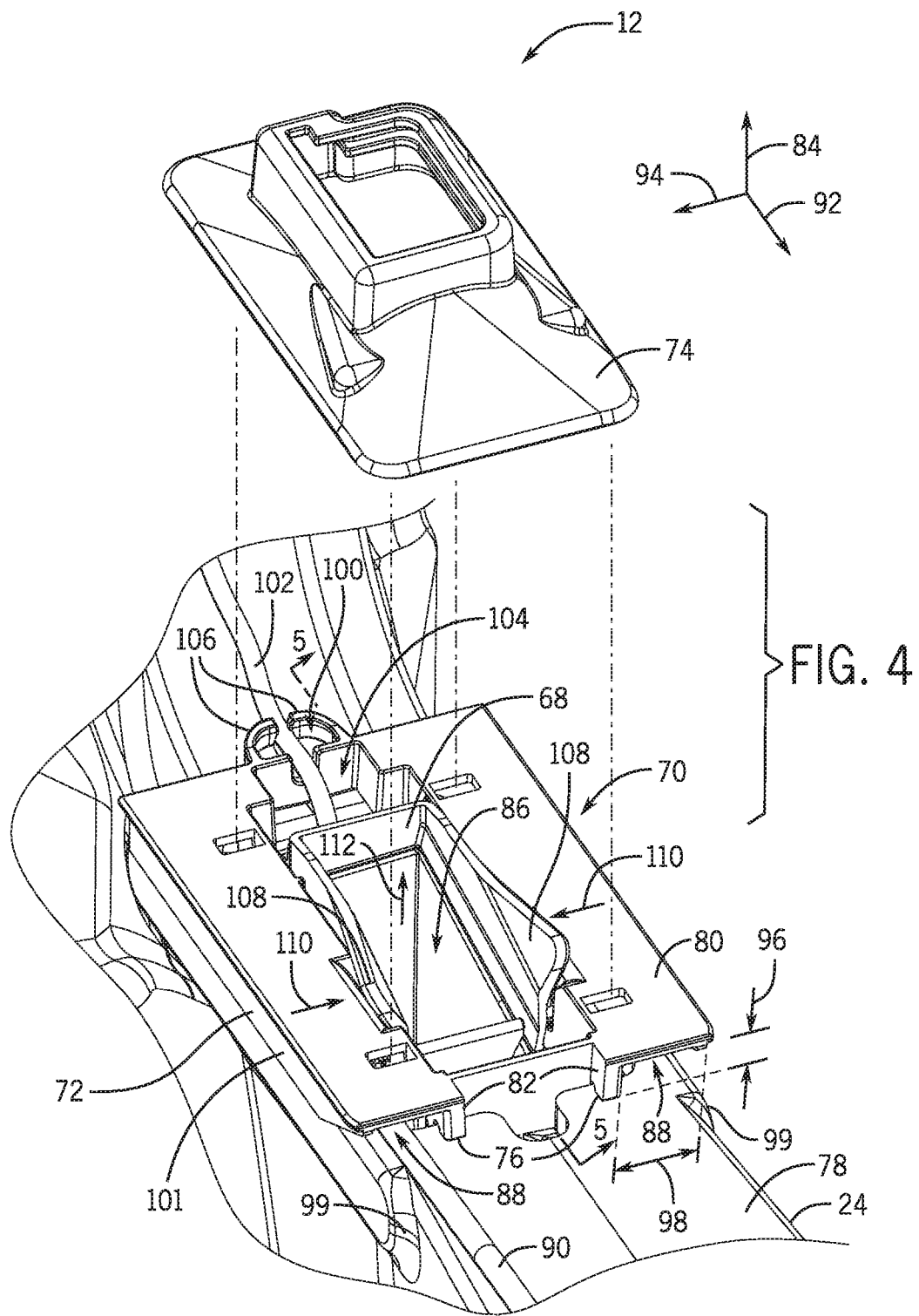
FIG. 4 is an exploded view of a portion of the row unit of FIG. 2, in which the seed tube is coupled to the frame of the row unit by the mounting assembly.

FIG. 4 is an exploded view of a portion of the row unit 12 of FIG. 2, in which the seed tube 68 is coupled to the frame 24 of the row unit 12 by the mounting assembly 70. In the illustrated embodiment, the mount 72 is supported on the frame 24 via contact between mounting surfaces 76 of the mount 72 and a top surface 78 of the frame 24. In addition, the mount 72 includes a mounting plate 80 (e.g., integrally formed with the mount) positioned above the frame 24 of the row unit 12. As illustrated, extensions 82 extend upwardly from the mounting surfaces 76 along a vertical axis 84 to the mounting plate 80. The mounting plate 80 is configured to engage the boot 74 of the seed meter to substantially block field debris (e.g., rocks, crop residue, etc.) from entering the seed tube 68 (e.g., via an inlet 86 of the seed tube 68).

As illustrated, the extensions 82 establish two gaps 88 between the mounting plate 80 and the top surface 78 of the frame 24. Each gap 88 is positioned laterally outward from a respective seed tube mounting feature, and each gap 88 is configured to facilitate passage of at least one conduit 90 along the frame 24. As used herein, "conduit" refers to an electrical conduit, an electrical cable, an electrical wire, an electrical wiring harness (e.g., including multiple electrical wires bundled together), a pneumatic conduit, a hydraulic conduit, or any other suitable flexible or substantially rigid elongated (e.g., tubular) structure. In the illustrated embodiment, the gaps 88 and the conduit 90 extend along a longitudinal axis 92 of the row unit 12. However, it should be appreciated that in alternative embodiments, at least one gap may be oriented at any suitable angle (e.g., 5 degrees, 10 degrees, 15 degrees, etc.) relative to the longitudinal axis 92. Furthermore, while the illustrated embodiment includes two gaps 88 positioned on opposite lateral sides of the mount 72 (e.g., opposite sides of the mount 72 relative to a lateral axis 94), it should be appreciated that in alternative embodiments, the mount may form more or fewer gaps (e.g., 0, 1, 2, 3, 4, or more). In certain embodiments, at least one gap may be formed on a longitudinal end of the mount. In such embodiments, the gap may extend along the lateral axis, or the gap may be oriented at a suitable angle (e.g., 5 degrees, 10 degrees, 15 degrees, etc.) relative to the lateral axis. A height 96 of each gap 88 (e.g., along the vertical axis 84) and a width 98 of each gap 88 (e.g., along the lateral axis 94) may be selected to accommodate an expected number of conduits and/or an expected diameter of each conduit.

In the illustrated embodiment, a protrusion 99 extends from each lateral side of the frame 24. Each protrusion 99 is configured to extend the width of the frame 24 along the lateral axis 94, thereby enabling the top surface 78 of the frame to form the bottom surface of each gap 88. In addition, the mount 72 includes an extension 101 positioned laterally outward from each respective extension 82 of the mount 72 (e.g., proximate to a respective protrusion 99 or in contact with the respective protrusion 99). Accordingly, in the illustrated embodiment, each gap 88 corresponds to a passage formed by the top surface 78 of the frame 24, the mounting plate 80 of the mount 72, and the extensions 82 and 101 of the mount 72. However, it should be appreciated that at least one extension 101 may be omitted in certain embodiments.

In the illustrated embodiment, the mount 72 includes a channel 100 configured to facilitate passage of a conduit 102 (e.g., an electrical conduit, an electrical wire, an electrical cable, an electrical wiring harness, a pneumatic conduit, a hydraulic conduit, etc.) through the mount 72. As illustrated, the channel 100 is positioned at a longitudinal end of the mount 72 and configured to enable the conduit 102 to pass from a gap 104 between the mount 72 and the seed tube 68 to a region outside of the mount 72. However, it should be appreciated that in alternative embodiments, the channel may be position in another area of the mount. In addition, while the illustrated embodiment includes one channel 100, it should be appreciated that in alternative embodiments, the mount may include more or fewer channels (e.g., 0, 1, 2, 3, 4, or more). In the illustrated embodiment, the mount 72 includes supports 106 positioned on opposite sides of the conduit 102 proximate to the channel 100. The supports 106 are configured to secure the conduit 102 to the mount 72, thereby reducing movement of the conduit 102 relative to the mount 72. In certain embodiments, the supports may be omitted, and/or the channel may be configured to secure the conduit to the mount.

As previously discussed, the seed tube 68 is removable from the mount 72, thereby enabling installation of a powered agricultural product conveyor. To remove the seed tube 68, an operator may apply a force to tabs 108 in an inward direction 110 along the lateral axis 94, such that the tabs 108 are deflected in the inward direction 110. As discussed in detail below, deflection of the tabs 108 drives protrusions of the seed tube 68 out of corresponding openings in the mount 72, thereby facilitating removal of the seed tube 68 via translation in an upward direction 112 along the vertical axis 84. With the seed tube removed, a biasing member configured to support a powered agricultural product conveyor may be coupled to the mount 72.

Figure 5:
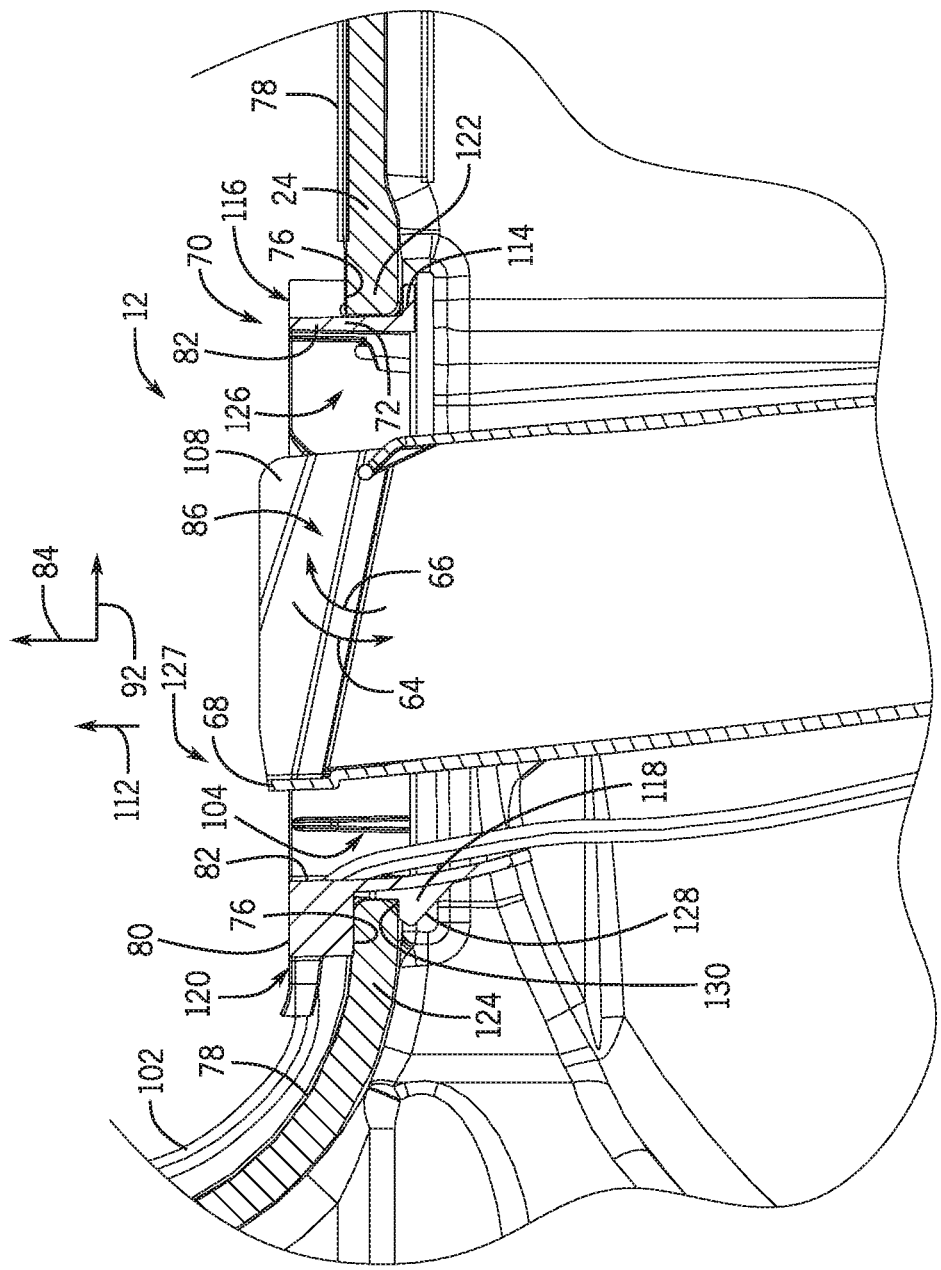
FIG. 5 is a cross-sectional side view of a portion of the row unit of FIG. 2, taken along line 5-5, in which the seed tube is coupled to the frame of the row unit by the mounting assembly.

FIG. 5 is a cross-sectional side view of a portion of the row unit 12 of FIG. 2, taken along line 5-5, in which the seed tube 68 is coupled to the frame 24 of the row unit 12 by the mounting assembly 70. As previously discussed, the mount 72 is supported on the frame 24 via contact between the mounting surfaces 76 of the mount 72 and the top surface 78 of the frame 24. In addition, the mount 72 is configured to facilitate coupling the seed tube 68 or the powered agricultural product conveyor to the frame 24. In the illustrated embodiment, the mount includes a lip 114 on a first longitudinal end 116 of the mount 72, and the mount 72 includes a biased engagement element 118 on a second longitudinal end 120 of the mount 72. The lip 114 and the biased engagement element 118 are configured to engage respective engagement elements 122 and 124 of the frame 24 to couple the mount 72 to the frame 24. In the illustrated embodiment, the first engagement element 122 of the frame 24 corresponds to a first edge of the frame 24 on a first longitudinal end of an opening 126, and the second engagement element 124 of the frame 24 corresponds to a second edge of the frame 24 on a second longitudinal end of the opening 126, opposite the first longitudinal end. As illustrated, the mount 72 is disposed within the opening 126 in the frame 24, and the seed tube 68 is disposed within an opening 127 in the mount 72.

The lip 114 and the mounting surface 76 are configured to capture the first engagement element 122, and the biased engagement element 118 and the mounting surface 76 are configured to capture the second engagement element 124, thereby securing the mount 72 to the frame 24. To couple the mount 72 to the frame 24, the mount 72 is positioned such that the first engagement element 122 is positioned between the lip 114 and the mounting surface 76. The mount 72 is then rotated downwardly in the first rotational direction 64 until the second engagement 124 is captured between the biased engagement element 118 and the mounting surface 76. In the illustrated embodiment, the biased engagement element 118 includes an angled surface 128 configured to deflect the biased engagement element 118 toward the opening 126 upon contact with the second engagement element 124 to facilitate installation of the mount 72. To remove the mount 72 from the frame (e.g., after removal of the seed tube 68), the biased engagement element 118 is deflected toward the opening 126 until an engagement surface 130 of the biased engagement element 118 is offset from the second engagement element 124 along the longitudinal axis 92. The mount 72 is then rotated upwardly in the second rotational direction 66 and translated away from the first engagement element 122 along the longitudinal axis 92 until the lip 114 and the mounting surface 76 disengage the first engagement element 122. However, in the illustrated embodiment, the seed tube and the powered agricultural product conveyor may be installed and removed without removing the mount from the frame. In addition, while the lip and the biased engagement element are positioned on opposite longitudinal ends of the mount in the illustrated embodiment, it should be appreciated that in alternative embodiments, the lip and the biased engagement element may be positioned on opposite lateral ends/sides of the mount.

Figure 6:
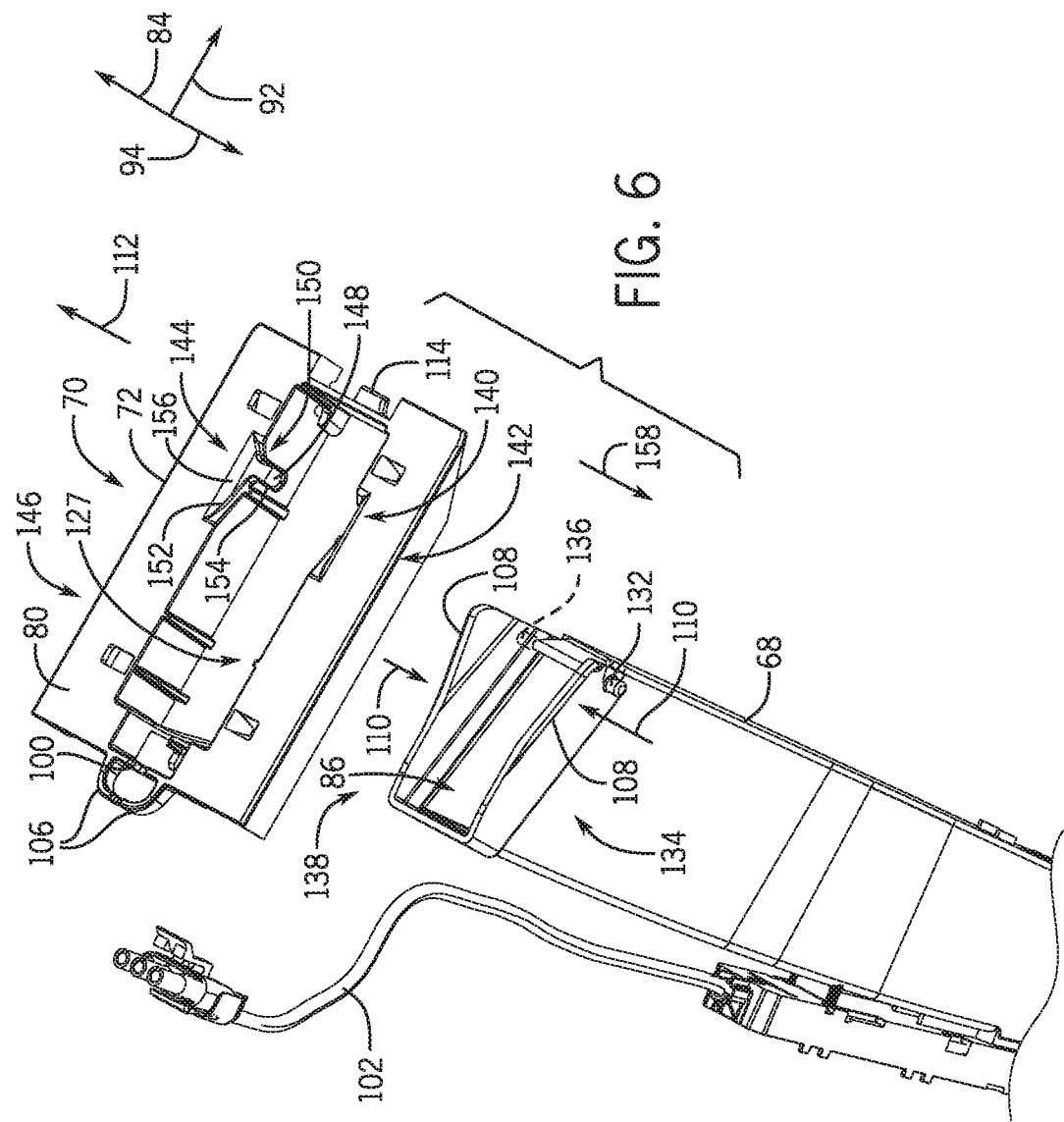
FIG. 6 is an exploded view of the seed tube and a mount of the mounting assembly of FIG. 3.

FIG. 6 is an exploded view of the seed tube 68 and the mount 72 of the mounting assembly 70 of FIG. 3. In the illustrated embodiment, the seed tube 68 includes a first protrusion 132 (e.g., mounting feature) on a first lateral side 134 of the seed tube 68 and a second protrusion 136 on a second lateral side 138 of the seed tube 68, opposite the first lateral side 134. In addition, the mount 72 includes a first seed tube mounting feature 140 on a first lateral side 142 of the mount 72 and a second seed tube mounting feature 144 on a second lateral side 146 of the mount, opposite the first lateral side 142. The first seed tube mounting feature 140 is configured to capture the first protrusion 132 of the seed tube 68, the second seed tube mounting feature 144 is configured to capture the second protrusion 136, and the seed tube mounting features are configured to support the seed tube 68 on the mount 72. In the illustrated embodiment, each seed tube mounting feature 140 and 144 includes an opening 148 configured to receive a respective protrusion of the seed tube, and a channel 150 configured to guide the respective protrusion of the seed tube toward the opening 148. Furthermore, in the illustrated embodiment, each channel 150 includes an angled portion 152 configured to direct the respective protrusion of the seed tube to a substantially straight portion 154, which is oriented substantially along the vertical axis 84 and configured to guide the respective protrusion of the seed tube to the opening 148.

To couple the seed tube 68 to the mount 72, the seed tube 68 is aligned with the opening 127 in the mount 72 and translated in a downward direction 158 along the vertical axis 84. Contact between the protrusions 132 and 136 of the seed tube 68 and the angles portions 152 of the respective channels 150 directs the protrusions 132 and 136 toward the straight portions 154 of the respective channels 150. When the protrusions 132 and 136 are aligned with the openings 148 of the respective seed tube mounting features 140 and 144, the protrusions 132 and 136 engage the openings 148, thereby coupling the seed tube 68 to the mount 72. In the illustrated embodiment, the distance between the openings 148 along the lateral axis 94 is less than the distance between the distal ends of the protrusions 132 and 136 along the lateral axis 94. Accordingly, the protrusions 132 and 136 extend through the openings 148, thereby coupling the seed tube 68 to the mount 72. In the illustrated embodiment, each seed tube mounting feature 140 and 144 includes a rounded top edge 156 configured to laterally compress the seed tube 68 via contact with the distal ends of the protrusions 132 and 136 (e.g., to reduce the lateral distance between the distal ends of the protrusions 132 and 136) during installation to facilitate movement of the seed tube in the downward direction 158 (e.g., to facilitate downward movement of the protrusions 132 and 136 through the channels 150). While the seed tube 68 is coupled to the mount 72, rotation of the seed tube 68 about the protrusions 132 and 136 is blocked by contact between the seed tube 68 and another structure of the row unit (e.g., a shank, etc.).

To remove the seed tube 68, an operator may apply a force to the tabs 108 in the inward direction 110 along the lateral axis 94, such that the tabs 108 are deflected in the inward direction 110. Deflection of the tabs 108 in the inward direction 110 drives the protrusions 132 and 136 of the seed tube 68 out of the openings 148 of the respective seed tube mounting features 140 and 144, thereby facilitating removal of the seed tube 68 via translation in the upward direction 112 along the vertical axis 84. With the seed tube removed, a biasing member configured to support a powered agricultural product conveyor may be coupled to the mount 72.

While the illustrated embodiment includes two seed tube mounting features, it should be appreciated that in alternative embodiments, the mount may include more or fewer seed tube mounting features (e.g., 1, 2, 3, 4, or more). In addition, while the seed tube mounting features are positioned on opposite lateral sides of the mount in the illustrated embodiment, it should be appreciated that in alternative embodiments, the seed tube mounting feature(s) may be positioned at other locations of the mount (e.g., on opposite longitudinal ends of the mount, etc.). While the channel of each seed tube mounting feature includes one angled portion and one substantially straight portion, it should be appreciated that in alternative embodiments, at least one channel may include more or fewer angled portions and/or more or fewer substantially straight portions. Furthermore, while the substantially straight portion of each channel is oriented substantially along the vertical axis in the illustrated embodiment, it should be appreciated that in alternative embodiments, the substantially straight portion of at least one channel may be angled (e.g., at about 5 degrees, at about 10 degrees, at about 15 degrees, etc.) relative to the vertical axis. In addition, while each seed tube mounting feature includes a rounded top edge, it should be appreciated that in alternative embodiments, the seed tube mounting features may include other features configured to laterally compress the seed tube during installation (e.g., the angled portion of at least one channel may be sloped laterally inward, and/or the substantially straight portion of at least one channel may be sloped laterally inward).

Figure 7:
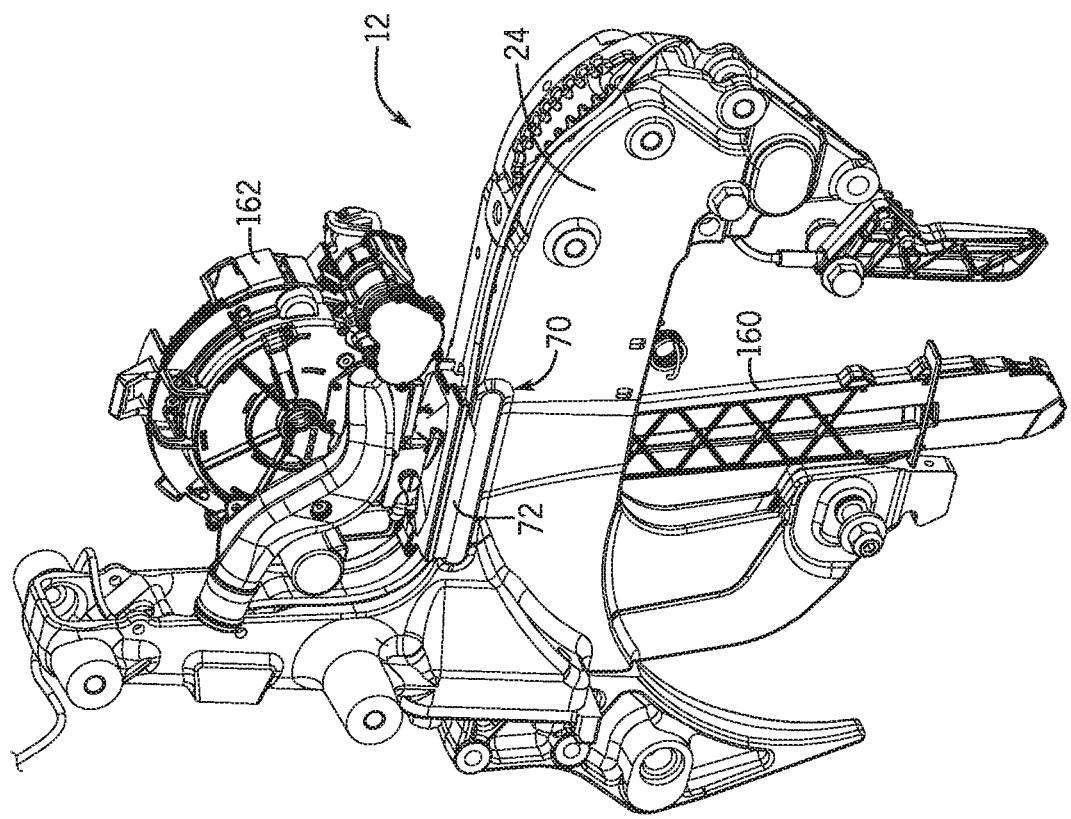
FIG. 7 is a perspective view of a portion of the row unit of FIG. 2, in which a powered agricultural product conveyor is coupled to the frame of the row unit by the mounting assembly.

FIG. 7 is a perspective view of a portion of the row unit 12 of FIG. 2, in which a powered agricultural product conveyor 160 is coupled to the frame 24 of the row unit 12 by the mounting assembly 70. In the illustrated embodiment, the powered agricultural product conveyor 160 is in contact with a seed meter 162. The illustrated seed meter 162 may function similarly to the seed meter 52 described above with reference to FIGS. 2-3. However, the illustrated seed meter 162 may include a housing configured to interface with the powered agricultural product conveyor 160. As previously discussed, the powered agricultural product conveyor 160 includes a system that drives seeds and/or other agricultural products from the seed meter 162 into a trench formed in the soil at a horizontal exit speed greater than the horizontal exit speed of seeds/agricultural products expelled from a seed tube under the influence of gravity. Accordingly, the speed of the planting implement may be increased to about 10 MPH, for example, thereby increasing the efficiency of planting operations.

In the illustrated embodiment, the mounting assembly 70 includes a biasing member, such as a wire spring. In addition, the mount 72 of the mounting assembly 70 includes a biasing member mounting feature configured to engage a corresponding mounting feature of the biasing member. For example, the biasing member mounting feature may include an opening and a support, and the biasing member may include a wire spring. The opening may be configured to receive a distal end of the wire spring, and the support may be configured to support a portion of the wire spring proximate to the distal end. In addition, the wire spring may include a support portion configured to engage a support surface (e.g., of the row unit frame) to support another portion of the wire spring. A protrusion of the powered agricultural product conveyor 160 may engage the wire spring, such that the wire spring supports the powered agricultural product conveyor 160. The wire spring may also urge the powered agricultural product conveyor 160 into contact with the housing of the seed meter 162, thereby establishing a connection between an outlet of the seed meter 162 and an inlet of the powered agricultural product conveyor 160.

Figure 8:
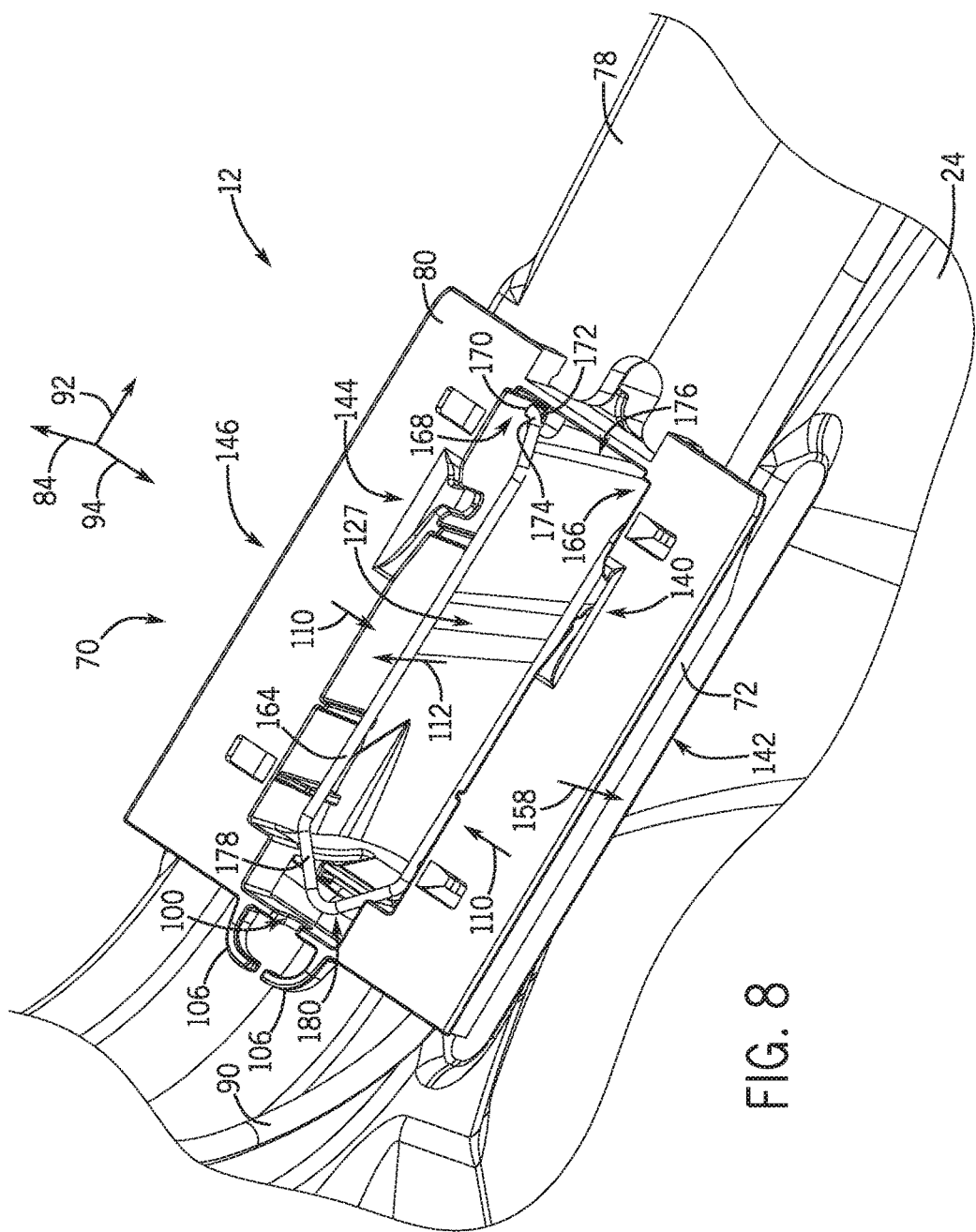
FIG. 8 is a perspective view of a portion of the row unit of FIG. 7, in which the mounting assembly is coupled to the frame of the row unit.

FIG. 8 is a perspective view of a portion of the row unit 12 of FIG. 7, in which the mounting assembly 70 is coupled to the frame 24 of the row unit 12. In the illustrated embodiment, the mounting assembly 70 includes a biasing member, such as the illustrated wire spring 164. In addition, the mount 72 of the mounting assembly 70 includes a first biasing member mounting feature 166 on the first lateral side 142 of the mount 72 and a second biasing member mounting feature 168 on the second lateral side 146 of the mount 72. Each biasing member mounting feature 166 and 168 includes an opening 170 and a support 172. The opening 170 of each biasing member mounting feature is configured to receive a respective protrusion, such as a respective distal end 174, of the wire spring 164. Accordingly, in the illustrated embodiment, each distal end 174 of the wire spring 164 is a mounting feature configured to engage a respective biasing member mounting feature of the mount 72. In addition, the support 172 of each biasing member mounting feature 166 and 168 is configured to support a portion of the wire spring 164 proximate to the respective distal end 174. Accordingly, the first and second biasing member mounting features 166 and 168 support a first longitudinal end 176 of the wire spring 164. In the illustrated embodiment, the wire spring 164 includes a support portion 178 at a second longitudinal end 180 of the wire spring 164, opposite the first longitudinal end 176. The support portion 178 is configured to engage the top surface 78 (e.g., support surface) of the frame 24 to support the second longitudinal end 180 of the wire spring 164.

As discussed in detail below, the mounting assembly 70 may include a boot having a contact portion configured to be disposed on top of the mounting plate 80 of the mount 72. The boot may be engaged with the mount at least while the powered agricultural product conveyor is supported by the mounting assembly. Furthermore, as previously discussed, protrusions of the powered agricultural product conveyor may engage the wire spring 164, such that the wire spring 164 supports the powered agricultural product conveyor. While the powered agricultural product conveyor is supported by the mounting assembly 70, rotation of the powered agricultural product conveyor about the protrusions may be blocked by contact between the powered agricultural product conveyor and the seed meter and/or by contact between the powered agricultural product conveyor and another structure of the row unit (e.g., a shank, etc.). The wire spring 164 is configured to urge the powered agricultural product conveyor into contact with the seed meter housing, thereby accommodating variations in the position of the seed meter relative to the frame (e.g., due to variations in the position/orientation of the arm, the latch, the joint, etc.). Accordingly, the biasing force applied by the wire spring 164 establishes a connection between the seed meter outlet and the powered agricultural product conveyor inlet. The boot may be formed from a resilient material (e.g., rubber) and configured to dissipate energy associated with contact between a portion of the powered agricultural product conveyor and the contact portion of the boot.

While each biasing member support feature includes an opening and a support, it should be appreciated that in alternative embodiments, the support may be omitted. In addition, in further embodiments, other biasing member support features (e.g., a slot configured to receive the distal end of the wire spring, etc.) may be utilized. Furthermore, while the support portion of the wire spring engages the top surface of the frame in the illustrated embodiment, it should be appreciated that in alternative embodiments, the support portion may engage a support surface of the mount or another element of the row unit. While the distal ends of the wire spring are configured to engage the biasing member mounting features in the illustrated embodiment, it should be appreciated that in alternative embodiments, other protrusions of the wire spring, or other biasing member, may be configured to engage the biasing member mounting features. In addition, while the illustrated embodiment includes a wire spring, it should be appreciated that other biasing members (e.g., a resilient strip of material, a compressible foam material, etc.) may be utilized in alternative embodiments. If another biasing member is utilized, the biasing member mounting feature(s) may be particularly selected to support the selected biasing member(s). Furthermore, while the illustrated embodiment includes two biasing member mounting features, it should be appreciated that in alternative embodiments, the mount may include more or fewer (e.g., 1, 2, 3, 4, or more) biasing member mounting features. While the biasing member mounting features are positioned on opposite lateral sides of the mount in the illustrated embodiment, it should be appreciated that in alternative embodiments, the biasing member mounting feature(s) may be positioned at other locations on the mount (e.g., on opposite longitudinal ends of the mount, etc.). In addition, it should also be appreciated that in certain embodiments, more biasing members (e.g., 2, 3, 4, or more) may be employed to support the powered agricultural product conveyor.

Figure 9:
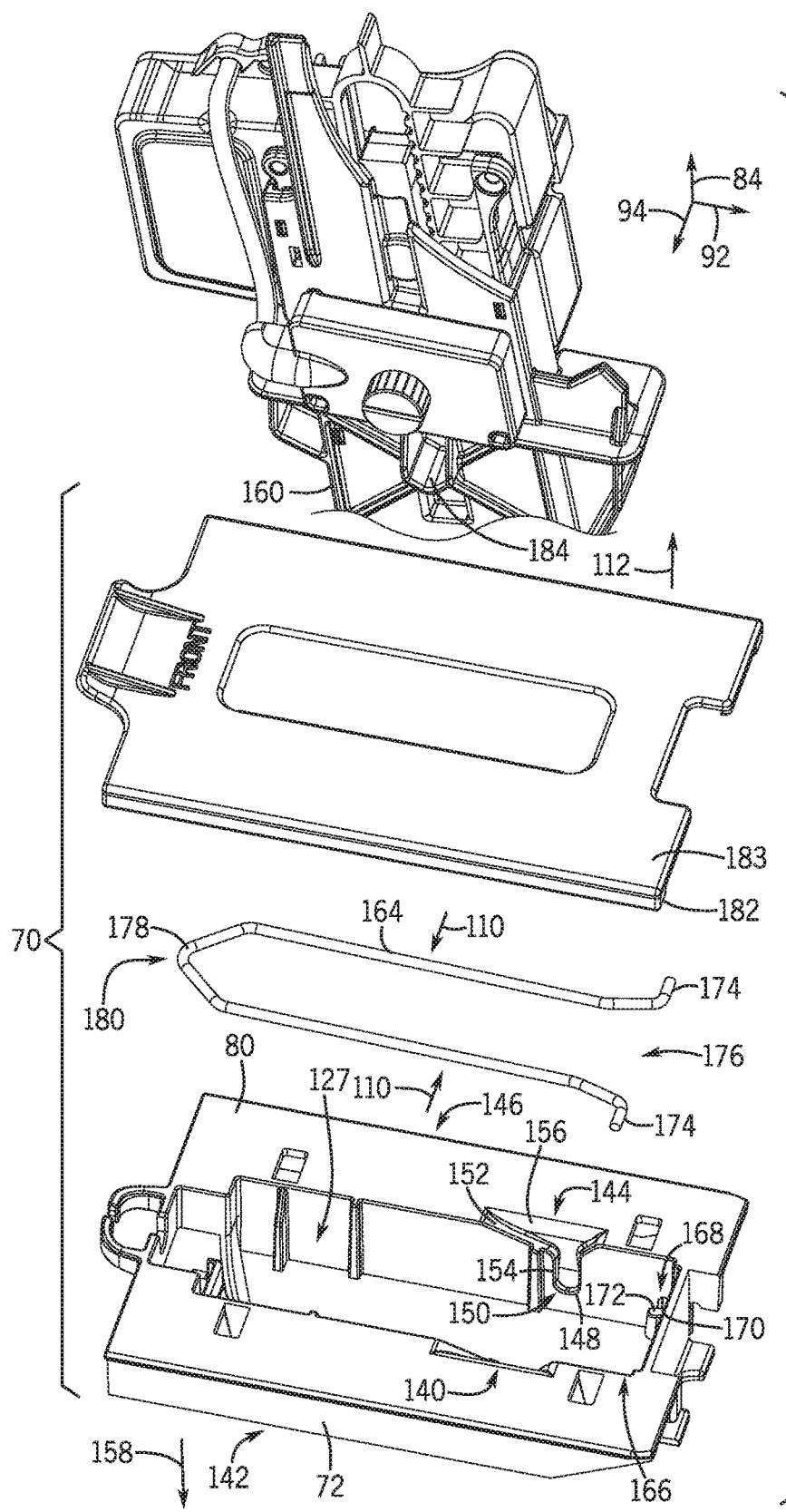
FIG. 9 is an exploded view of the powered agricultural product conveyor and the mounting assembly of FIG. 7.

FIG. 9 is an exploded view of the powered agricultural product conveyor 160 and the mounting assembly 70 of FIG. 7. As previously discussed, the mounting assembly 70 includes a boot 182 having a contact portion 183 configured to be disposed on top of the mounting plate 80 of the mount 72 (e.g., above the mounting plate 80 along the vertical axis 84) at least while the biasing member 164 is coupled to the mount 72 and the powered agricultural product conveyor 160 is supported by the mounting assembly 70. The first step in installing the powered agricultural product conveyor 160 is to couple the wire spring 164 to the mount 72. To couple the wire spring 164 to the mount 72, the wire spring 164 is compressed in the inward direction 110 along the lateral axis 94 such that a width of the wire spring 164 (e.g., extent of the wire spring 164 along the lateral axis 94) at the distal ends 174 is less than a width of the opening 127 in the mount 72 (e.g., extent of the opening 127 along the lateral axis 94) above the biasing member mounting features 166 and 168. The wire spring 164 is then moved in the downward direction 158 along the vertical axis 84 until the distal ends 174 contact the respective supports 172. Compression of the wire spring 164 is then released, which induces the distal ends 174 to engage the respective openings 170. In addition, the support portion 178 of the wire spring 164 is engaged with the top surface of the frame, or another suitable support surface. The boot 182 is then coupled to the mount 72. For example, in certain embodiments, the boot includes channels on each lateral side of the boot. In such embodiments, the channels are aligned with respective lateral edges of the mount, and the boot is moved along the longitudinal axis such that the respective lateral edges of the mount engage the channels, thereby securing the boot to the mount. Next, the powered agricultural product conveyor is aligned with the opening 127 and moved in the downward direction 158 until protrusions 184 of the powered agricultural product conveyor 160 (e.g., at least one protrusion on each lateral side of the powered agricultural product conveyor, etc.) engage the wire spring 164.

To remove the powered agricultural product conveyor 160 and install the seed tube, the powered agricultural product conveyor is moved in the upward direction 112 along the vertical axis 84. The boot 182 is then disengaged from the mount 72 (e.g., via translation along the longitudinal axis to disengage the lateral edges of the mount from the channels of the boot). Next, the wire spring 164 is compressed in the inward direction 110 along the lateral axis 94 until the distal ends 174 are disengaged from the openings 170. The wire spring 164 is then moved in the upward direction 112 along the vertical axis 84. As previously discussed, to couple the seed tube to the mount 72, the seed tube is aligned with the opening 127 in the mount 72 and translated in the downward direction 158 along the vertical axis 84. Contact between the protrusions of the seed tube and the angled portions 152 of the respective channels 150 directs the protrusions of the seed tube toward the straight portions 154 of the respective channels 150. When the protrusions of the seed tube are aligned with the openings 148 of the respective seed tube mounting features 140 and 144, the protrusions of the seed tube engage the openings 148, thereby coupling the seed tube to the mount 72. While the boot 182 is removed from the mount 72 before installation of the seed tube, it should be appreciated that in alternative embodiments, the boot may remain coupled to the mount while the seed tube is supported by the mounting assembly.

While only certain features of the present disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A mounting assembly for an agricultural product conveying system, comprising:
    a mount having an opening, a seed tube mounting feature, and a biasing member mounting feature; and
    a biasing member configured to be disposed within the opening and to support a powered agricultural product conveyor;
    wherein the seed tube mounting feature is configured to engage a corresponding mounting feature of a seed tube to support the seed tube on the mount within the opening, and the biasing member mounting feature is configured to engage a corresponding mounting feature of the biasing member to support the biasing member on the mount within the opening; and
    wherein the mount is configured to be coupled to a frame of an agricultural row unit to facilitate selectively coupling the seed tube and the powered agricultural product conveyor to the frame.

2. The mounting assembly of claim 1, comprising a boot configured to selectively couple to the mount at least while the biasing member is engaged with the biasing member mounting feature.

3. The mounting assembly of claim 1, wherein the mount comprises a mounting plate configured to be positioned above the frame to establish a gap between the mounting plate and the frame sufficient to facilitate passage of a conduit between the mounting plate and the frame.

4. The mounting assembly of claim 1, wherein the mount comprises a channel configured to facilitate passage of a conduit through the mount.

5. The mounting assembly of claim 1, wherein the biasing member comprises a wire spring, the corresponding mounting feature of the biasing member comprises a distal end of the wire spring, the biasing member mounting feature comprises an opening configured to receive the distal end of the wire spring, and the biasing member mounting feature comprises a support configured to support a portion of the wire spring proximate to the distal end.

6. The mounting assembly of claim 1, wherein the corresponding mounting feature of the seed tube comprises a protrusion, the seed tube mounting feature comprises an opening configured to receive the protrusion, and the seed tube mounting feature comprises a channel configured to guide the protrusion toward the opening of the seed tube mounting feature.

7. The mounting assembly of claim 1, wherein the mount comprises a lip on a first end of the mount and a biased engagement element on a second end of the mount, opposite the first end, and the lip and the biased engagement element are configured to engage respective engagement elements of the frame to couple the mount to the frame.

8. A mounting assembly for an agricultural product conveying system, comprising:
   a mount having an opening, a seed tube mounting feature, and a biasing member mounting feature;
   a biasing member configured to be disposed within the opening and to support a powered agricultural product conveyor;
   wherein the seed tube mounting feature is configured to capture a protrusion of a seed tube, and the seed tube mounting feature is configured to support the seed tube on the mount within the opening;
   wherein the biasing member mounting feature is configured to capture a protrusion of the biasing member, and the biasing member mounting feature is configured to support the biasing member on the mount within the opening; and
   wherein the mount is configured to be coupled to a frame of an agricultural row unit to facilitate selectively coupling the seed tube and the powered agricultural product conveyor to the frame.

9. The mounting assembly of claim 8, wherein the biasing member comprises a wire spring, and the protrusion of the biasing member corresponds to a distal end of the wire spring.

10. The mounting assembly of claim 9, wherein the protrusion of the biasing member is positioned on a first longitudinal end of the wire spring, the wire spring comprises a support portion on a second longitudinal end of the wire spring, opposite the first longitudinal end, and the support portion is configured to engage a support surface to support the second longitudinal end of the wire spring.

11. The mounting assembly of claim 9, wherein the biasing member mounting feature comprises an opening configured to receive the distal end of the wire spring, and the biasing member mounting feature comprises a support configured to support a portion of the wire spring proximate to the distal end.

12. The mounting assembly of claim 8, comprising a boot configured to selectively couple to the mount at least while the biasing member is engaged with the biasing member mounting feature.

13. The mounting assembly of claim 8, wherein the seed tube mounting feature comprises an opening configured to receive the protrusion of the seed tube, and the seed tube mounting feature comprises a channel configured to guide the protrusion of the seed tube toward the opening of the seed tube mounting feature.

14. The mounting assembly of claim 8, wherein the mount comprises a lip on a first end of the mount and a biased engagement element on a second end of the mount, opposite the first end, and the lip and the biased engagement element are configured to engage respective engagement elements of the frame to couple the mount to the frame.

15. The mounting assembly of claim 8, wherein the mount comprises a mounting plate configured to be positioned above the frame to establish a gap between the mounting plate and the frame sufficient to facilitate passage of a conduit between the mounting plate and the frame.

16. The mounting assembly of claim 8, wherein the mount comprises a channel configured to facilitate passage of a conduit through the mount.

17. A mounting assembly for an agricultural product conveying system, comprising:
   a mount configured to be partially disposed within an opening in a frame of an agricultural row unit, wherein the mount is configured to support the agricultural product conveying system within an opening of the mount to facilitate coupling the agricultural product conveying system to the frame, the mount comprises a mounting plate extending about the opening of the mount, and the mounting plate is configured to be positioned above the frame to establish a gap between the mounting plate and the frame sufficient to facilitate passage of a conduit between the mounting plate and the frame.

18. The mounting assembly of claim 17, wherein the mount comprises an extension extending from the mounting plate and configured to engage a top surface of the frame to position the mounting plate above the frame.

19. The mounting assembly of claim 17, wherein the gap is positioned on a lateral side of the mount.

* * * * *